United States Patent [19]

Lehtimäki

[11] Patent Number: 6,125,120
[45] Date of Patent: Sep. 26, 2000

[54] TRANSMISSION EQUIPMENT FOR AN INTEREXCHANGE CONNECTION

[75] Inventor: Matti Lehtimäki, Espoo, Finland

[73] Assignee: Nokia Telecommunications OY, Espoo, Finland

[21] Appl. No.: 08/930,148

[22] PCT Filed: Feb. 4, 1997

[86] PCT No.: PCT/FI97/00062

§ 371 Date: Oct. 7, 1997

§ 102(e) Date: Oct. 7, 1997

[87] PCT Pub. No.: WO97/29566

PCT Pub. Date: Aug. 14, 1997

[30] Foreign Application Priority Data

Feb. 8, 1996 [FI] Finland ................................. 960590

[51] Int. Cl.[7] ................................................... H04J 3/17
[52] U.S. Cl. ...................... 370/435; 370/521; 704/200; 704/500; 455/436
[58] Field of Search .................................. 370/477, 203, 370/204, 212, 213, 336, 362, 269, 287, 521, 435; 375/240, 241, 242; 455/422, 436, 336, 406, 518, 466, 12.1, 72, 426; 704/500, 200

[56] References Cited

U.S. PATENT DOCUMENTS

| | | | |
|---|---|---|---|
| 5,301,190 | 4/1994 | Tsukuda et al. | 370/362 |
| 5,612,992 | 3/1997 | Dupuy et al. | 455/466 |
| 5,692,105 | 11/1997 | Leppanen et al. | 370/336 |
| 5,884,173 | 3/1999 | Sollner | 455/436 |
| 5,892,811 | 4/1999 | Armbruster et al. | 455/12.1 |

FOREIGN PATENT DOCUMENTS

| | | |
|---|---|---|
| 332 345 | 9/1989 | European Pat. Off. . |
| 93/00778 | 1/1993 | WIPO . |
| WO 95/08899 | 3/1995 | WIPO . |
| 96/16521 | 5/1996 | WIPO . |
| 96/23297 | 8/1996 | WIPO . |
| 96/32823 | 10/1996 | WIPO . |

OTHER PUBLICATIONS

"European digital cellular telecommunications system (Phase 2); In-band control of remote transcoders and rate adaptors for half rate traffic channels (GSM 08.61)", European Telecommunication Standard, pr ETS 300 598, Aug. 1995, Source: ETSI TC-SMG, Reference: DE/SMG-030861P, ICS: 33.060.50, pp. 2–39.

ETSI Recommendation GSM 08.60, Feb. 1992, "Inband Control of Remote Transcoders and Rate Adaptors".

Primary Examiner—Michael Horabik
Assistant Examiner—Prenell Jones
Attorney, Agent, or Firm—Pillsbury Madison & Sutro

[57] ABSTRACT

A compression method and apparatus for a transmission link in a telecommunications network between switching centers each associated with a compression apparatus connected thereto by a number of PCM transmission channels for receiving a speech signal from each PCM transmission channel and transferring the speech signal via an interconnecting PCM link having a transmission capacity lower than the number of transmission channels received from the switching center to the other compression apparatus. The speech signal between the first switching center and the compression apparatus is either a pure PCM coded speech signal or a PCM coded speech signal in which one or more least significant bits of the PCM samples provide a subchannel for lower-rate vocoded speech containing the same speech information as the PCM samples but in a vo-coded format. The interconnecting link has one or more PCM channels in each of which all bits of the PCM samples are utilized for providing two or more subchannels in each of which lower-rate vocoded speech or data can be transmitted. One compression apparatus is arranged, in response a PCM coded speech signal containing the subchannel, to multiplex the content of the subchannel into one of the subchannels in the interconnecting link, and, in response to a pure PCM coded speech signal, to encode the latter into a lower-rate vocoded speech signal and to multiplex the vocoded speech signal into one of the subchannels in the interconnecting link.

19 Claims, 6 Drawing Sheets

FIG. 2

| OCTET NUMBER | BIT NUMBER | | | | | | | |
|---|---|---|---|---|---|---|---|---|
| | 1 | 2 | 3 | 4 | 5 | 6 | 7 | 8 |
| 0 | 0 | 0 | 0 | 0 | 0 | 0 | 0 | 0 |
| 1 | 0 | 0 | 0 | 0 | 0 | 0 | 0 | 0 |
| 2 | 1 | C1 | C2 | 0C3 | C4 | C5 | C6 | C7 |
| 3 | C8 | C9 | C10 | C11 | C12 | C13 | C14 | C15 |
| 4 | 1 | | | | | | | |
| 5 | | | | | | | | |
| 6 | 1 | | | | | | | |
| 7 | | | | | | | | |
| 8 | 1 | | | | | | | |
| 9 | | | | | | | | |
| 10 | 1 | | | | | | | |
| 11 | | | | | | | | |
| 12 | 1 | | | | | | | |
| 13 | | | | | | | | |
| 14 | 1 | | | | | | | |
| 15 | | | | | | | | |
| 16 | 1 | | | | | | | |
| 17 | | | | | | | | |
| 18 | 1 | | | | | | | |
| 19 | | | | | | | | |
| 20 | 1 | | | | | | | |
| 21 | | | | | | | | |
| 22 | 1 | | | | | | | |
| 23 | | | | | | | | |
| 24 | 1 | | | | | | | |
| 25 | | | | | | | | |
| 26 | 1 | | | | | | | |
| 27 | | | | | | | | |
| 28 | 1 | | | | | | | |
| 29 | | | | | | | | |
| 30 | 1 | | | | | | | |
| 31 | | | | | | | | |
| 32 | 1 | | | | | | | |
| 33 | | | | | | | | |
| 34 | 1 | | | | | | | |
| 35 | | | | | | | | |
| 36 | 1 | | | | | | | |
| 37 | | | | | | | | |
| 38 | 1 | | | | | | C16 | C17 |
| 39 | C18 | C19 | C20 | C21 | T1 | T2 | T3 | T4 |

TRANSMISSION EQUIPMENT FOR AN INTEREXCHANGE CONNECTION

This application is the national phase of international application PCT/FI97/00062 filed Feb. 4, 1997 which designated the U.S.

FIELD OF THE INVENTION

The present invention relates to mobile communication systems employing speech coding, and in particular to transmission equipment for interexchange connections.

BACKGROUND OF THE INVENTION

Mobile communication networks generally provide service in a very wide area, which is based on radio coverage offered by a terrestrial base station network or satellite repeaters. Base station systems or satellite terrestrial stations are connected to mobile services switching centres. A network operator may employ several interconnected mobile service switching centres. Furthermore, the mobile services switching centres must have connections to the public switched telephone network PSTN and to other mobile communication networks in various countries. Normally, interexchange digital connections are provided through which speech and data are transferred in 64 kbit/s PCM (Pulse Code Modulation) channels. These connections may be fixed or semi-fixed, or they may be established for each call individually. The fixed or semi-fixed connections are purchased and leased connections. In each case, it is important to the operators to optimize the utilization of the connection capacity and to minimize the costs arising therefrom.

One way of realizing this is to multiplex several calls into a PCM channel. Since there is a standard PCM interface between the exchanges, through which e.g. speech is transferred in the form of 64 kbit/s PCM samples, this requires speech compression, i.e. speech coding to a lower rate, and decompression at the ends of the connection. Compression equipment is complex and causes compatibility and signalling problems at the interexchange interfaces. Furthermore, speech coding to a low rate will inevitably deteriorate speech quality in comparison with 64 kbit/s PCM coding and is therefore not always an acceptable solution.

In digital mobile communication systems, also the entire speech and data transmission is digital. As far as the mobile communication network is concerned, the most limited resource is the radio path between the mobile stations and the base stations. To reduce the bandwidth requirements of a radio connection in the radio path, speech transmission utilizes speech encoding affording a lower transmission rate, for example 16 or 18 kbit/s instead of the 64 kbit/s transmission rate typically used in telephone networks. Speech encoding, which is based on representing speech as parameters, will be generally termed vo-coding (speech encoding) herein in distinction to PCM coding. Both sides of the radio interface, i.e. both the mobile station and the fixed network end, have a speech encoder and a speech decoder. The speech coder on the network side is sometimes also termed a transcoder. The transcoder may be accommodated in several alternative locations, for example at the base station or in the mobile services switching centre. The transcoder is often located remote from the base station in a 'remote transcoder unit'. In the latter case, speech encoding parameters are sent between the base station and the transcoder unit in specific frames.

In each mobile terminating or mobile originating speech call, a transcoder is connected to the speech connection on the network side. The interface of the transcoder towards the mobile services switching centre is 64 kbit/s. The transcoder decodes the mobile originating speech signal (uplink direction), vocoded into a 8/16 kbit/s transmission channel, to a rate of 64 kbit/s, and encodes the mobile terminating 64 kbit/s speech signal (downlink direction) to a rate of 8/16 kbit/s. Hence, also speech quality is lower than in a normal telephone network.

However, compression equipment at interexchange connections would further degrade speech quality. This is due to tandem speech coding: encoding at the mobile station, decoding in the transcoder, encoding in first compression equipment, and decoding in second compression equipment. In such a case, one party of the call is a mobile station and the other a subscriber of a public switched telephone network (PSTN), for instance.

If the call takes place between two mobile stations (Mobile to Mobile Call, MMC), even multiple speech coding may be performed. In such a case, there is a transcoder on the connection between the calling mobile station and the mobile services switching centre, and, correspondingly, a second transcoder between the called mobile subscriber and the (same or another) mobile services switching centre. These transcoders are then interconnected through the connection between the mobile services switching centres as a result of normal call switching. In other words, for each MMC call there are two transcoder units in series connection, and speech encoding and decoding are performed twice for the call. So far, tandem coding has not been a major problem because relatively few calls have been MMC calls. However, as the number of mobile stations increases, the number of MMC calls will also be higher and higher. One speech compression operation on the interexchange connection would worsen the situation by increasing the number of speech coding operations to three. If the call has to be routed via several mobile services switching centres and via compressed intermediate connections, the number of speech encoding operations may be multiplied.

BRIEF SUMMARY OF THE INVENTION

The object of the present invention is novel transmission equipment for optimizing interexchange connections.

The invention relates to transmission equipment for a connection between network elements, such as exchanges or base station controllers, the transmission equipment being intended to be connected to a number of inbound PCM transmission channels from a network element for receiving a speech signal from each PCM transmission channel and for transferring said speech signal to another transmission equipment via an interconnecting PCM link having a transmission capacity lower than said number of PCM transmission channels received from the network element. The equipment is characterized in that the speech signal between the network element and the transmission equipment is either a pure PCM coded speech signal or a PCM coded speech signal in which one or more least significant bits of the PCM samples provide a subchannel for lower-rate vocoded speech, said interconnecting PCM link has one or more PCM channels in which bits of the PCM samples provide two or more subchannels in each of which lower-rate vocoded speech or data can be transmitted, the transmission equipment is arranged, in response to the fact that the speech signal of the PCM channel received from the network element is a PCM coded speech signal containing said subchannel, to multiplex the content of the subchannel into one of the subchannels in said interconnecting PCM link, the transmission equipment is adapted, in response to the fact that the speech signal received from the network element is a pure PCM coded speech signal, to encode this PCM coded speech signal into a lower-rate vocoded speech signal and to multiplex the vocoded speech signal into one of the subchannels in said interconnecting PCM link.

The invention also relates to a method in accordance with Claim 10 for transferring digitally encoded speech between network elements, such as exchanges or base station controllers, in a mobile communication system.

In the present invention, both ends of the connection between network elements in a telecommunication network, such as exchanges or base station controllers, are provided with a transmission equipment connected to the respective one of the network elements with PCM channels. Preferably at least one of the exchanges is a mobile services switching centre. Speech conveyed between the exchange and the compression equipment is either pure PCM coded speech, or PCM coded speech in which one or more least significant bits of the PCM samples provide a subchannel for lower-rate vocoded speech. This subchannel contains the same speech information as the PCM samples, but in the form of speech parameters of the vocoding method employed by the mobile communication system. Between the transmission equipment, one PCM channel carries several subchannels. The transmitting compression equipment analyzes the speech signal received from the exchange. If the speech signal contains a subchannel of vocoded speech, the content of this subchannel is multiplexed into one of the subchannels in the PCM channel between the transmission equipments. For a case where the speech signal contains only PCM coded speech the transmission equipment includes a transcoder unit encoding the PCM coded speech by the vocoding method of the mobile communication system. This gives a lower-rate vocoded speech signal that is then multiplexed into one of the subchannels in the PCM channel between the compression equipments.

The receiving transmission equipment comprises a transcoder decoding the vocoded speech signal received from each subchannel into PCM samples in accordance with the vocoding method employed by the mobile communication system. In addition, the transmission equipment inserts the vocoded speech content of the subchannel into one or more least significant bits of the PCM samples without decoding. Thereafter the PCM samples and the vocoded subchannel therein are transferred via a dedicated PCM channel to the exchange.

The invention affords significant savings in interexchange connections. For instance, if one subchannel utilizes one bit in a PCM sample, 8 speech signals can be multiplexed into the PCM sample. Hence, the number of requisite interconnecting PCM links is considerably reduced, e.g. from 7 to 1, as some of the time slots are utilized for signalling.

Since there is a normal PCM interface between the exchange and the transmission equipment of the invention, the equipment is suited to all interexchange PCM links without any compatibility problems. The saving in the number of interconnecting links is achieved even though the lower-rate vocoded subchannel "hidden" in the PCM coded speech is not utilized elsewhere. In that case, however, compression will cause deterioration of speech quality, as described above.

In any case, the vocoded subchannel "hidden" in the PCM coded speech permits prevention of multiple speech coding if the transcoder of the mobile communication system is capable of utilizing it. The Applicants' co-pending PCT application WO96/32823 discloses one such transcoder having prevention of 'tandem coding'. An MMC call is established by normal procedures in such a way that the connection has two transcoders in tandem configuration. The speech transferred between a transcoder and a mobile station is encoded by a vocoding method which reduces the transmission rate. Both transcoders carry out the normal transcoding operations on the speech, decoding it in one transcoder into normal digital pulse code modulated (PCM) speech samples which are forwarded to the second transcoder and encoded therein by said vocoding method. In the subchannel provided by one or two least significant bits of the PCM speech samples, speech information in accordance with said vocoding method, which is received from the mobile station, is simultaneously transferred. The information comprises speech parameters on which no transcoding operations (encoding and decoding) are carried out in either of the tandem-connected transcoders. The receiving transcoder primarily selects the speech information that is in accordance with this vocoding method to be transmitted over the radio interface to the receiving mobile station. Consequently, vocoding is carried out primarily in the mobile stations only, and the vocoded speech information—i.e., speech parameters—is passed through the mobile communication network without tandem coding, which will improve speech quality. When the receiving transcoder cannot find vocoded speech information in the least significant bits of the PCM speech samples, the speech information to be transmitted over the radio interface is encoded in the normal manner from the PCM speech samples.

If the transmission equipment of the present invention receives PCM samples including vocoded speech information in the least significant bits from a transcoder of the above type, the transmission equipment forwards this vocoded speech information to a subchannel in the interconnecting PCM link without transcoding. The second transmission equipment decodes the PCM samples from the vocoded speech information received from the subchannel, and the vocoded speech information is inserted into the least significant bits of these PCM samples without decoding. If also the second transcoder supports tandem prevention, it forwards the vocoded speech information to the mobile station without decoding or encoding. Hence, the transmission equipment in accordance with the invention will not cause extra vocoding or deterioration of speech quality in an MMC call. If the other party, e.g. a subscriber in a PSTN network, does not support tandem prevention, it utilizes PCM samples decoded by the other transmission equipment. In the reverse direction, the second transmission equipment voencodes PCM samples received from the PSTN network and transmits the vocoded speech information to the interconnecting PCM link. The first transmission equipment and transcoder forward the vocoded speech information as such to the mobile station. Also in this case, the transmission equipment do not cause extra vocoding, as the encoding and decoding are only performed at the mobile station and in the second transmission equipment.

The transmission equipment in accordance with the invention does not affect exchange messaging or outbound voice mail calls. This is due to the fact that these involve normal PCM signals on which compression in accordance with the invention is performed for the interexchange transmission.

In one embodiment of the invention, the transmission equipment of the invention support two or more types of vocoding employed by the mobile communication system. The transmission equipment in accordance with the invention may select the vocoding method to be employed in the interconnecting PCM link by identifying the vocoding method employed in the subchannel at the PCM interface between the exchange and the transmission equipment. If this PCM interface does not have encoded speech, the transmission equipment may use a preselected vocoding method as default. If, for example, two mobile stations have selected different vocoding methods in a call, the transmission equipment can perform conversion on the encoded speech from one vocoding method to another in at least one transmission direction. It is possible that the conversion is performed by a TRAU unit in the other transmission direction. Let us assume by way of example that the first type of vocoding employed at the PCM interface of the exchange is different from the vocoding method employed in the interconnecting PCM link. In such a case, the transmission equipment will decode the speech information received from the exchange, which is in accordance with the first vocoding method, into a linear PCM sample or applies the received PCM samples directly, the samples being then encoded into speech information in accordance with the second vocoding method. Different vocoding methods often have different bit rates, cf. for example GSM full rate vocoding (transfer rate typically 16 kbit/s) and half rate vocoding (transfer rate typically 8 kbit/s). In this case, the interconnecting PCM links may comprise for example four 16 kbit/s subchannels that may transfer 8 kbit/s or 16 kbit/s speech information, for example. It is also possible that in the interexchange connections, some of the transmission equipment and interconnecting links are adapted to employ full rate vocoding only, and some of the transmission equipment and interconnecting links are adapted to employ half rate vocoding only.

Data may also be transferred through transmission equipment in accordance with the present invention. In that case, the transmission equipment is provided with the necessary rate adaptation functions.

BRIEF DESCRIPTION OF THE DRAWINGS

The invention will be explained in the following by means of preferred embodiments with reference to the accompanying drawings, in which

FIG. 2 shows a TRAU speech frame in accordance with GSM recommendation 8.60.

PREFERRED EMBODIMENTS OF THE INVENTION

The present invention is applicable to any mobile communication system which utilize digital speech transmission and speech encoding techniques reducing the transmission rate.

One example is the European digital cellular mobile communication system GSM (Global System for Mobile Communications) which is becoming a world-wide standard for mobile communication systems. The basic elements of the GSM system are described in the GSM recommendations. For a closer description of the GSM system, reference is made to the GSM recommendations and "The GSM System for Mobile Communications" by M. Mouly & M-B. Pautet, Palaiseau, France, 1992, ISBN: 2-9507190-0-7.

The GSM and its modifications DCS 1800 (Digital Communication System) which operates in the 1800 MHz frequency range are the primary targets for the invention, but it is not intended that the invention be restricted to these systems.

Figure 1:
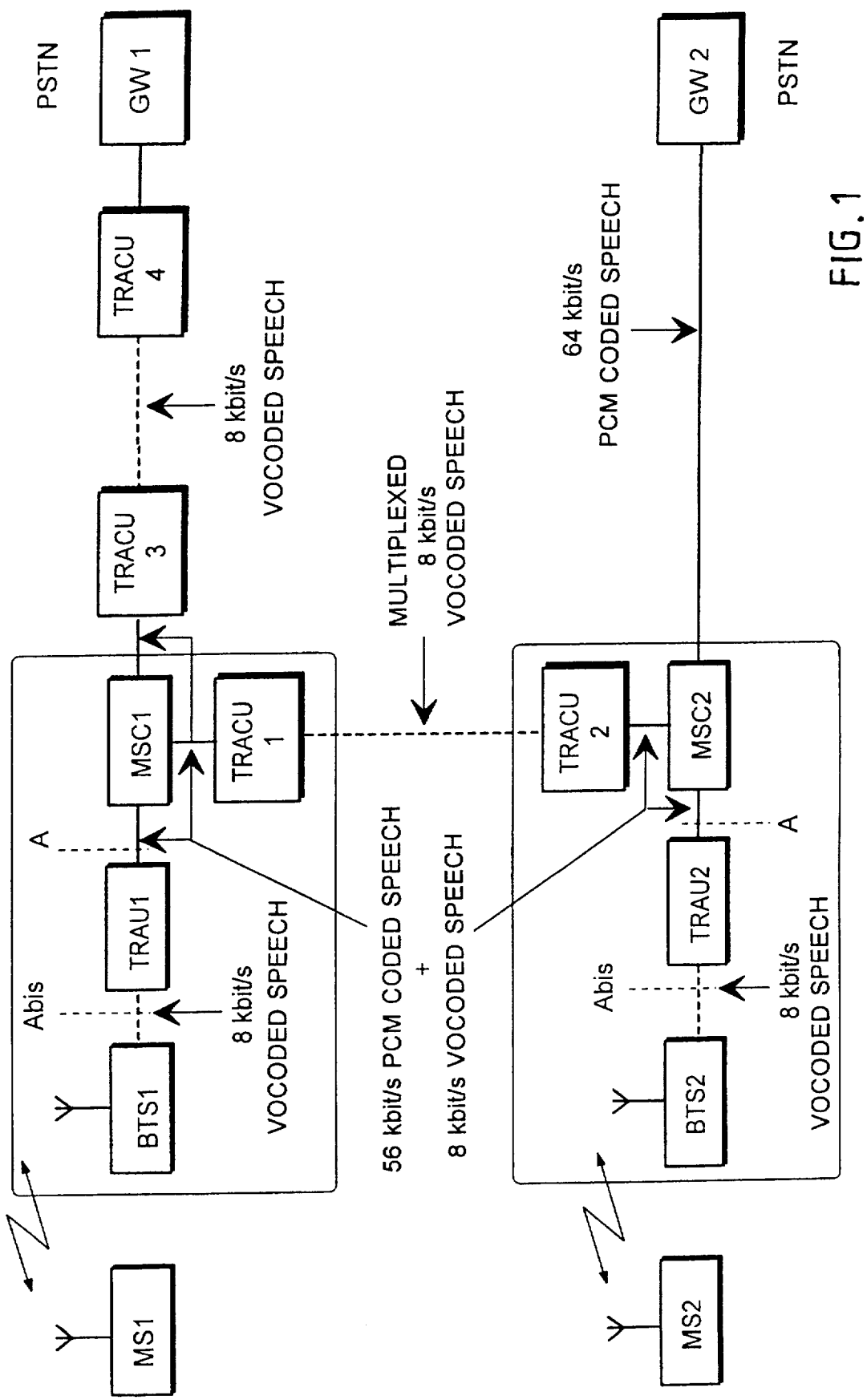
FIG. 1 shows a mobile communication system in accordance with the invention.

FIG. 1 very briefly describes the basic elements of the GSM system. A mobile services switching centre MSC handles the connecting of inbound and outbound calls. It performs functions similar to those of an exchange of a fixed network. In addition to these, it also performs functions characteristic of mobile communications only, such as subscriber location management. Mobile radio stations MS, i.e. mobile units, are connected to the exchange MSC by base station systems. A base station system consists of a base station controller BSC and base stations BTS. One base station controller BSC is used to control several base stations BTS.

The GSM system is entirely digital, and speech and data transmission are also carried out entirely digitally, which results in uniform quality of speech. In speech transmission, the current speech encoding method in use is RPE-LTP (Regular Pulse Excitation - Long Term Prediction), which utilizes both short-term and long-term prediction. The encoding produces LAR, RPE and LTP parameters which are sent instead of the actual speech. Speech transmission is dealt with in the GSM recommendations in Chapter 6, and speech encoding particularly in Recommendation 06.10. In the near future, other encoding methods such as half rate methods and reduced full rate coding will be employed; with these the present invention can be used as such. As the present invention does not relate to the actual speech encoding method and is independent thereof, no speech encoding method will be described in further detail herein. The speech encoding method will also be termed vocoding (voice coding) in the present application in distinction to normal PCM coding.

Naturally, the mobile station must have a speech coder and decoder for speech coding. As the implementation of the mobile station is neither essential to the present invention nor unique, it will not be described more closely in the context.

On the network side, various functions relating to speech encoding and rate adaptation are integrated in a transcoder unit TRAU (Transcoder/Rate Adaptor Unit). The TRAU may be accommodated in several alternative locations in the system according to choices made by the manufacturer. The interfaces of the transcoder unit includes a 64 kbit/s PCM (Pulse Code Modulation) interface towards the mobile services switching centre MSC (A interface), and a 16 or 8 kbit/s Abis interface towards the base station BTS.

In cases where the transcoder unit TRAU is placed remote from a base station BTS, information is sent at the Abis interface between the base station and the transcoder unit TRAU in 'TRAU frames'. A TRAU frame includes 320 bits according to Recommendation 08.60 and 160 bits according to Recommendation 0.61. There are presently four different frame types defined according to the information content of the frame: speech, operations/maintenance, data, and 'idle speech frame'. A transcoder unit placed remote from the base station BTS must receive information on the radio interface for efficient decoding. For such control and synchronization of the transcoder, a special kind of inband signalling is used on the 8 or 16 kbit/s channel between the base station and the transcoder unit. This channel is also used for speech and data transmissions. Such remote control of a transcoder unit is described in GSM Recommendation 08.60 (16 kbit/s channel) and 08.61 (8 kbit/s channel).

Normally, only PCM coded speech is transmitted at the A interface between the transcoder TRAU and the MSC. In that case, the transcoder TRAU can perform the transcoding between vocoded speech and PCM coded speech.

The Applicants' co-pending PCT application WO96/32823 discloses an improved transcoder TRAU, which besides performing the normal transcoding operations from vocoded speech into PCM coded speech also transmits speech information received from the mobile station, which is in accordance with said vocoding method, i.e. speech parameters on which no transcoding operation (decoding) is performed, in the subchannel formed by one (8 kbit/s capacity) or two (16 kbit/s capacity) least significant bits of the PCM speech samples. Likewise, in the other transmission direction the transcoder receives vocoded speech from the subchannel contained in the PCM samples of the A interface, said speech being transmitted to the Abis interface without any transcoding operation (encoding). When an MMC call involving two such transcoders in tandem configuration is switched, each transcoder actually only relays vocoded speech, possibly modifying or replacing parameters but not performing any extra vocoding. In consequence, vocoding is normally only carried out in the mobile station MS, whereby tandem coding is avoided and speech quality is improved. The implementation and operation of this improved transcoder has been disclosed in greater detail in the above PCT application.

Figure 3A:
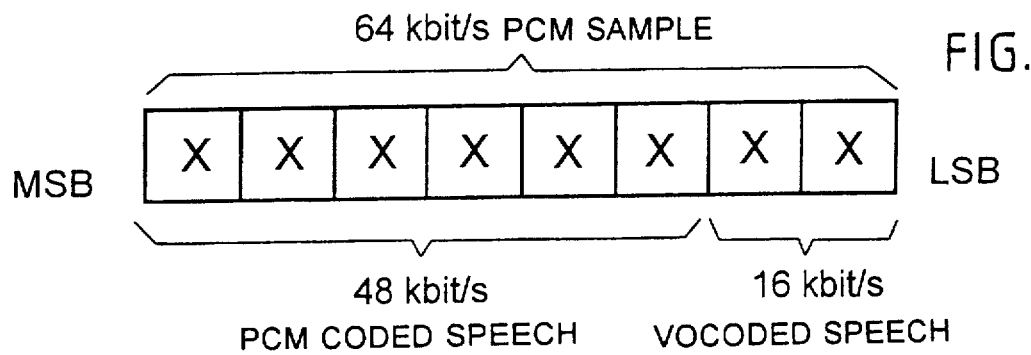
FIGS. 3a and 3b illustrate the forming of subchannels in least significant bits of a PCM sample.
Figure 3B:
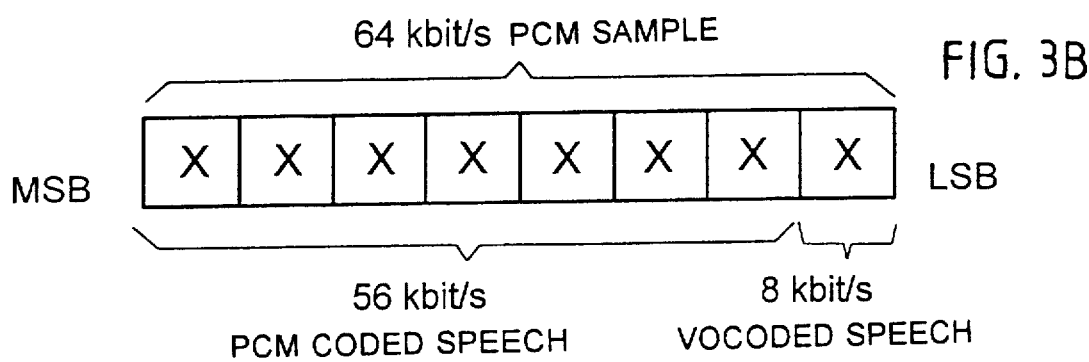
Figure 4:
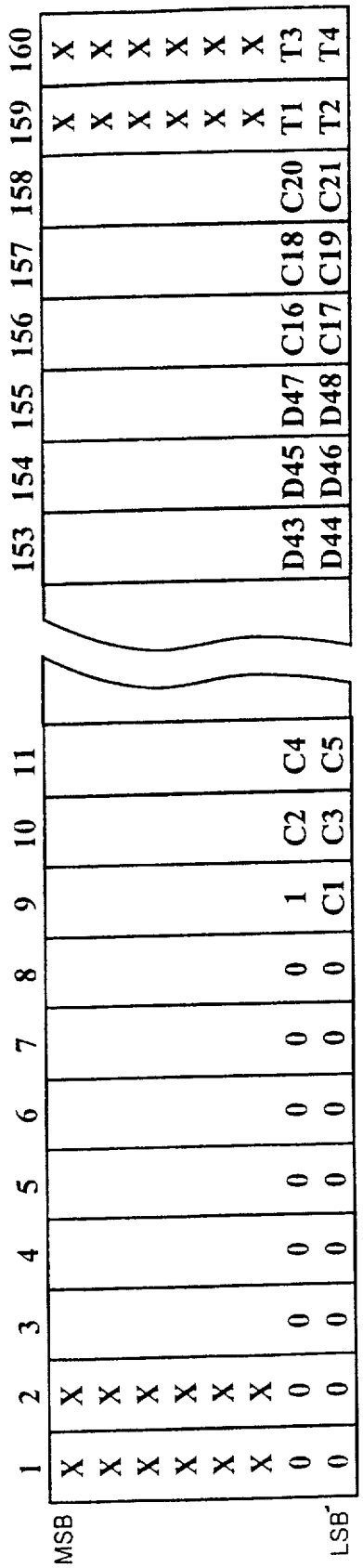
FIG. 4 illustrates the insertion, in accordance with the invention, of the TRAU frame of FIG. 2 into 160 successive 8-bit PCM samples.

Hence, two types of signals may appear at the A interface: 1) normal 64 kbit/s PCM, 2) PCM wherein one or two least significant bits of the PCM samples provide a subchannel for vocoded speech (or data). The transmission of vocoded speech in the least significant bits of a PCM sample is illustrated in FIGS. 3A and 3B. FIG. 4 further illustrates one possible way of inserting the TRAU frame of FIG. 2 into 160 successive 8-bit PCM samples. Two bits of the TRAU frame are inserted into each PCM sample in place of two least significant bits of the PCM sample in accordance with FIG. 3A. PCM samples 1–8 contain synchronization zeros, PCM samples 9–18 control bits C1–C15, PCM samples 19–155 data bits, and PCM samples 156–160 control bits C16–C21 and T1–T4. The six most significant bits of the PCM samples are original bits of the PCM speech sample (marked with the symbol x). In the example of FIG. 3A, the transfer rate of the PCM coded speech is 48 kbit/s and that of the subchannel 16 kbit/s. If the subchannel is implemented with one bit, as in FIG. 3B, the transfer rate of the PCM coded speech is 56 kbit/s and that of the subchannel 8 kbit/s.

The mobile services switching centre MSC switches the calls at a nominal transfer rate of 64 kbit/s, irrespective of whether the signal to be connected is of type 1) or type 2).

In a conventional mobile communication network, also the interexchange links comprise one 64 kbit/s PCM channel for each signal of the A interface. Interexchange links in this context mean both links between mobile services switching centres MSC and links between a mobile services switching centre MSC and a gateway mobile services switching centre GW in a public switched telephone network. As stated previously, for reasons of economy it would be advantageous to optimize the required capacity on the interexchange connections.

Figure 6A:
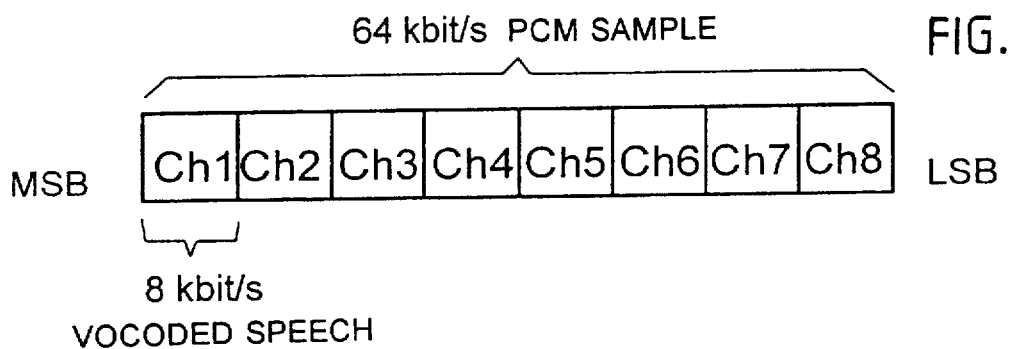
FIGS. 6a and 6b illustrate the forming of subchannels in least significant bits of a PCM sample in a PCM channel between the transmission equipment.
Figure 6B:
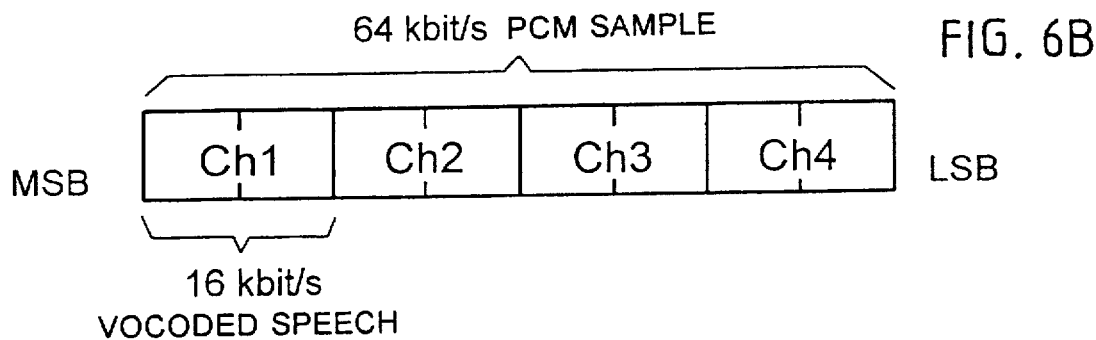
Figure 5:
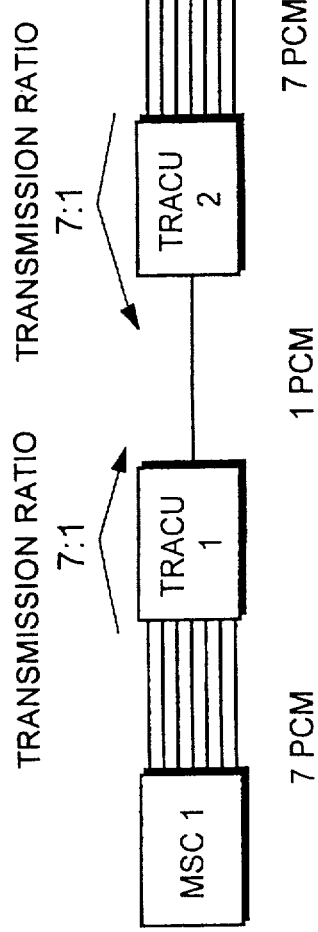
FIG. 5 is a block diagram illustrating the transfer of signals of seven PCM channels via one interconnecting PCM link by transmission equipment of the invention.

In accordance with the invention, the exchanges are interconnected with a pair of transmission equipments in such a way that there is one equipment at both ends of the connection, as shown in FIGS. 1 and 5. These transmission equipment are termed compression equipment TRACU (Transcoding and Rate Adaptation Compression Unit) in the present description. Speech is transmitted between the MSC (GW) and the TRACU similarly as at the A interface, i.e. either as pure PCM coded speech (type 1) or as PCM coded speech containing a subchannel of vocoded speech. At least one 64 kbit/s PCM channel is provided between the TRACUs, in which speech is always transmitted as vocoded 8 kbit/s or 16 kbit/s speech in one or two bits of the PCM sample. The principle is the same as shown for interface A in FIG. 3, but now all bits of the PCM sample are used as subchannels and no PCM coded speech is transmitted. Hence, for example two least significant bits form one 16 kbit/s subchannel, two next more significant bits a second 16 kbit/s subchannel, two next more significant bits a third 16 kbit/s subchannel, as illustrated in FIG. 6B. Correspondingly, each PCM bit can form one 8 kbit/s subchannel, as shown in FIG. 6A. The same PCM channel may also contain both 8 kbit/s and 16 kbit/s subchannels. In this way, the TRACUs can multiplex 1–8 PCM bit streams of the A interface into one PCM bit stream for communication between the TRACUs. In the example of FIG. 5, TRACU1 and TRACU2 multiplex 7 PCM lines of the A interface into one PCM line (compression ratio 1:8, transmission ratio 1:7).

Speech transferred between the exchange MSC and the compression equipment TRACU is either pure PCM coded speech or PCM coded speech in which one or more least significant bits of the PCM samples form a subchannel of lower-rate vocoded speech, as shown in FIGS. 3A and 3B.

The following will describe the operation of compression equipment in accordance with the invention in transmitting a speech signal in one direction MSC1-TRACU1-TRACU2-MSC2. In the reverse direction, the transfer takes place in a similar manner.

TRACU1 analyzes the speech signal received from the exchange MSC1 in each PCM channel. If the signal contains a subchannel for vocoded speech, the content of the subchannel is multiplexed into one of the subchannel in the PCM channel between the TRACUs. If the speech signal contains only PCM coded speech, TRACU1 encodes the PCM coded speech by the vocoding method of the mobile communication system. This will give a lower-rate vocoded speech signal which is multiplexed into one of the subchannels in the PCM channel between the TRACUs.

Figure 7:
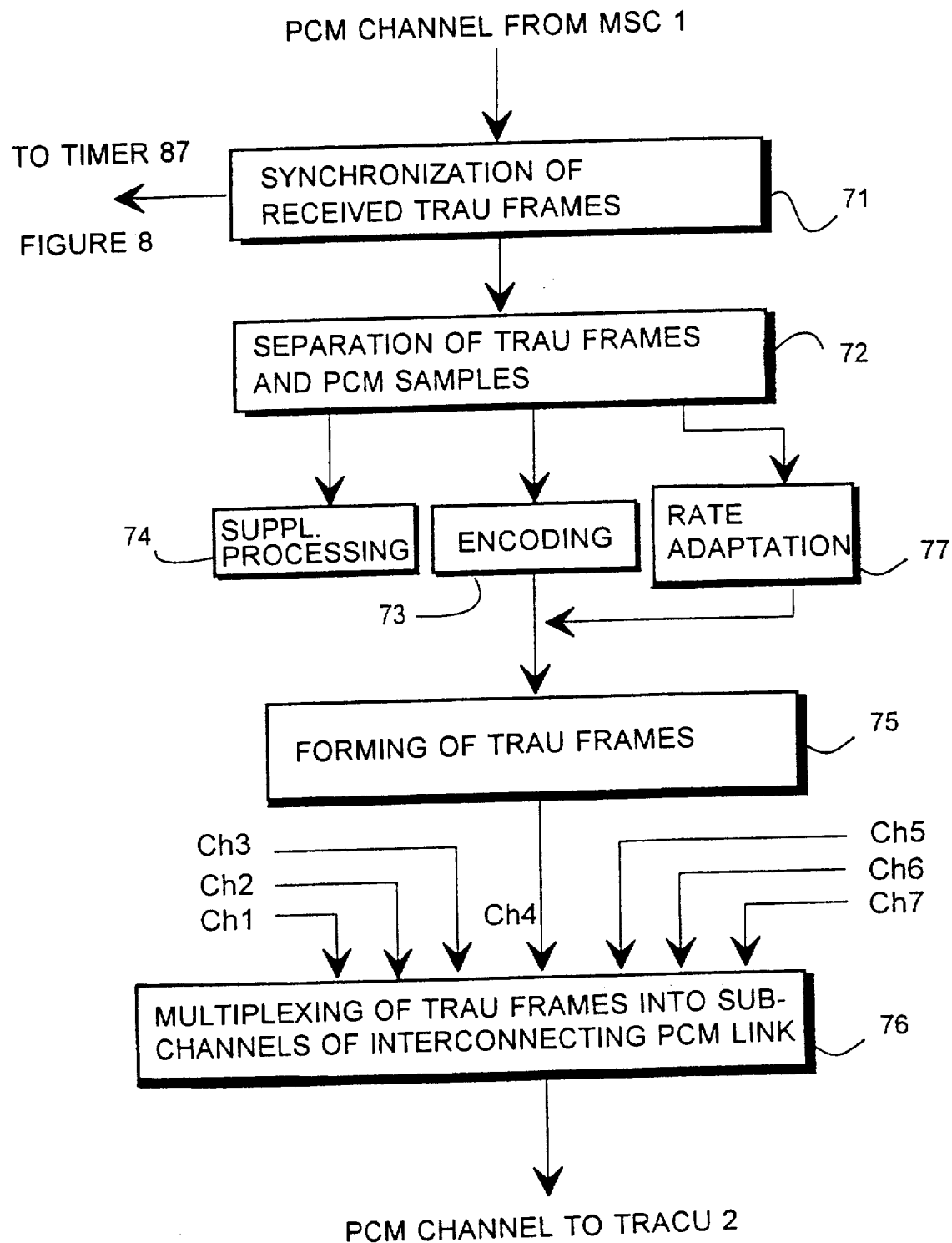
FIGS. 7 and 8 are block diagrams illustrating the operation of the transmission equipment at the different ends of the interconnecting PCM link.

FIG. 7 shows a block diagram representing the operations of a transcoder TRACU1. In accordance with GSM Recommendations 8.60 or 8.61, synchronization block 71 of TRACU1 continuously searches for synchronization in the subchannel in the PCM samples received from the A interface, i.e. in the one or two least significant bits. Synchronization with the TRAU frames takes place by means of the synchronization zeros and ones in the frames. At the beginning of the call when synchronization has not been found yet, or during the call when synchronization has been lost, reception of a sufficient number of TRAU frames is awaited in order to ensure that a 8 or 16 kbit/s subchannel containing TRAU frames has truly been found, and not merely a synchronization pattern randomly produced by the least significant bits of normal PCM samples. Synchronization with the frames is carried out continuously.

Separation block 72 separates the PCM speech samples to encoding block 73 and the TRAU frames to processing block 74.

The encoding block 73 performs encoding of the PCM speech samples into speech encoding parameters of the lower rate speech encoding method in full accordance with the GSM recommendations. The encoding of the PCM samples takes place continuously regardless of whether synchronization with TRAU frames has been achieved or not.

If synchronization with TRAU frames has not taken place, or verification or synchronization is awaited, the speech coding parameters that have been encoded from the PCM speech samples are forwarded from the encoding block 73 to a frame building block 75. The building block 75 inserts the speech coding parameters into TRAU frames in accordance with GSM Recommendation 08.60 or 08.61 for transfer to TRACU2.

If synchronization with TRAU frames has taken place, the speech coding parameters are not forwarded from the encoding block 73 to the frame building block 75. Instead, the building block 75 is supplied with the TRAU frames received from the A interface, which TRAU frames have possibly been processed in supplementary processing block 74. The building block 75 produces TRAU frames in accordance with GSM Recommendation 08.60 or 08.61 to be forwarded to TRACU2. As no speech encoding is carried out, the TRAU frames to be forwarded contain essentially the same speech parameters and control data as the TRAU frames received through the A interface. The supplementary processing block 74 does, however, check the control bits and other bits of the TRAU frame received from the A interface and may, depending on their content, carry out supplementary functions which may change the content of the TRAU frames that are sent to TRACU2.

The operation performed by the supplementary processing block 74 are not essential to the actual invention. They may be necessary for the tandem prevention operation of the transcoder units TRAU1 and TRAU2. The processing possibly needed is similar to that described in the above application.

The above-described blocks 71–75 are for processing a speech signal of one inbound PCM channel of the A interface. Corresponding blocks 71–75 exist for each inbound PCM channel of the A interface.

From frame building blocks 75, the TRAU frames are forwarded to multiplexing block 76. The multiplexing block 76 inserts the TRAU frames received from the different building blocks into different subchannels Ch1–Ch7 of the interconnecting PCM link, i.e. into bits of the PCM sample, for example in accordance with FIG. 6A. The PCM samples formed are sent to TRACU2.

TRACU2 decodes the vocoded speech signal received from each subchannel into PCM samples in accordance with the vocoding method employed by the mobile communication system. Furthermore, TRACU2 inserts the vocoded speech content of the subchannel into one or more least significant bits of the PCM samples without decoding. Thereafter the PCM samples and the vocoded subchannel therein are transferred via the dedicated PCM channel of the A interface to the exchange MSC2.

Figure 8:
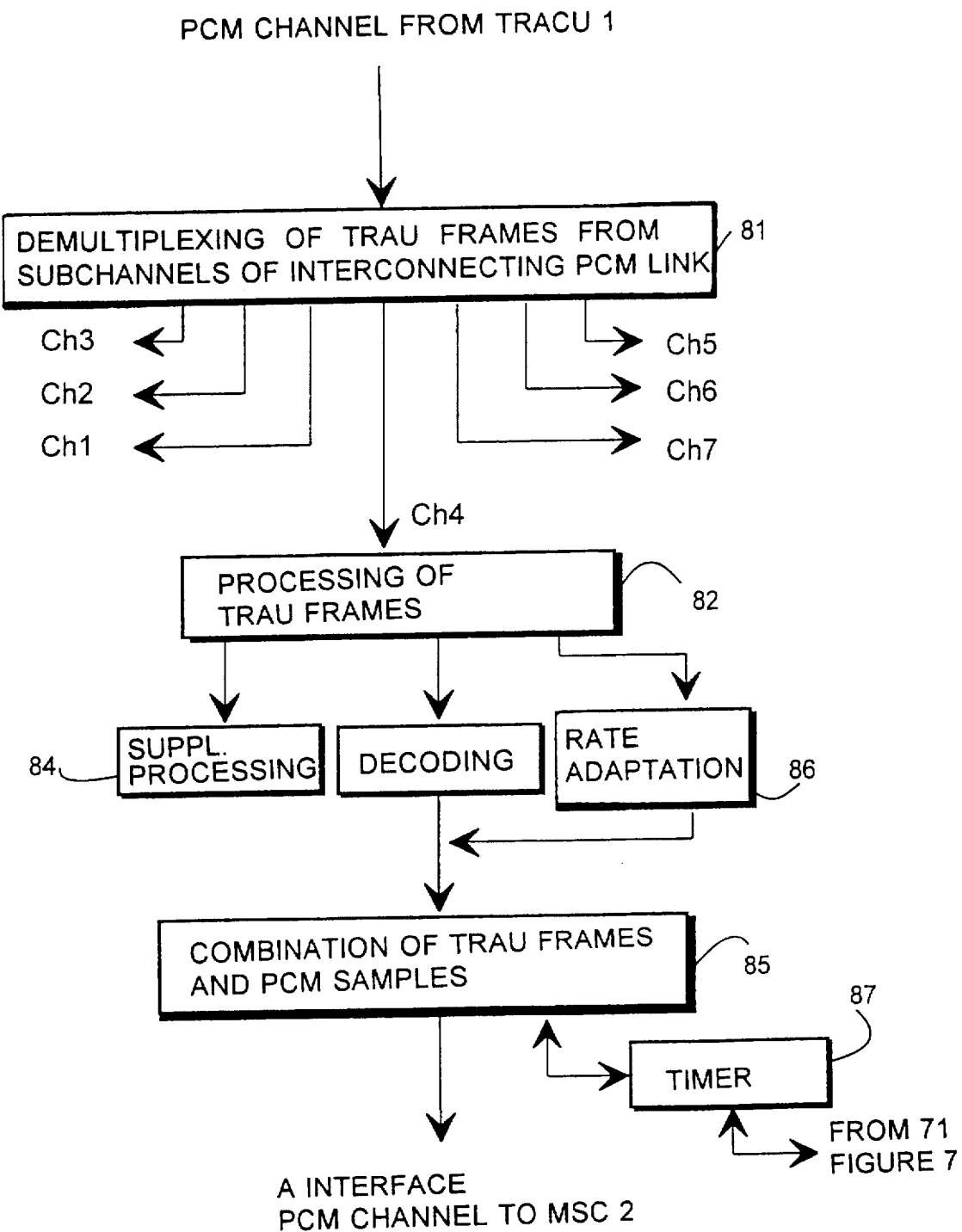

FIG. 8 shows a block diagram illustrating the operations of TRACU2. Demultiplexing block 81 receives PCM samples via the interconnecting PCM link from TRACU2. The demultiplexing block 81 demultiplexes the TRAU frames, i.e. the different PCM bits, of the different subchannels Ch1–Ch7 into respective processing blocks 82. The simplest construction for the processing blocks 82 is a divider dividing the TRAU frames to speech decoding 83 and supplementary processing 84. The operation of the block 82 may, however, also comprise some or all of the operations specified in the GSM recommendations for the transcoder unit TRAU upon receiving TRAU frames from the base station BTS.

Speech decoding 83 is in accordance with the GSM recommendations, and produces from the speech coding parameters a digital speech signal which is applied to pulse code modulation (PCM) block 85, which converts the digital speech signal to a bit rate of 64 kbit/s by means of pulse code modulation (PCM) in accordance with e.g. CCITT Recommendations G.711–G.716. The pulse code modulation (PCM) at a rate of 64 kbit/s functions in such a way that the speech signal is sampled every 125 microseconds, i.e. the rate of sampling is 8 kHz, and the amplitude of each sample is quantized into an 8-bit code by using A-law or u-law coding.

The supplementary processing block 84 produces a TRAU frame in accordance with GSM Recommendation 08.60 or 08.61 to be forwarded to block 85. As decoding is not performed, the TRAU frames that are forwarded to block 85 comprise essentially the same speech parameters and control data as the TRAU frames received from TRACU1. Block 84 may, however, check the control bits and other bits of the received TRAU frame and may, depending on their content, carry out supplementary functions which may change the content of the TRAU frames. The operations performed by the supplementary processing block 84 area not essential to the actual invention. They may be necessary for the tandem prevention operation of the transcoder units TRAU1 and TRAU2. The processing possibly needed is similar to that described in the above-stated patent application.

Block 85 combines the TRAU frames to the PCM block into the PCM speech samples by inserting the TRAU frames into a "subchannel" formed by the least significant bit (8 kbit/s) or two least significant bits (16 kbit/s) in accordance with FIGS. 3A and 3B. Block 85 forwards the PCM samples via the respective PCM channel of the A interface to MSC2.

TRACU2 comprises separate blocks 82–85 for each PCM channel of the A interface.

For the reverse transmission direction MSC2-TRACU2-TRACU1-MSC1, TRACU2 comprises blocks in accordance with FIG. 7 and TRACU1 comprises blocks in accordance with FIG. 8.

In the primary embodiment of the invention, the TRACUs handle either full rate (16 kbit/s) or half rate (8 kbit/s) vocoding operations, several of which may exist at the same rate.

TRACUs in accordance with a second embodiment of the invention are capable of handling both vocoding rates of the GSM network. The TRACU selects the vocoding it employs on the basis of the vocoding of the TRAU frames of the A interface. An exception is a situation where the vocoding of TRAU frames received from the A interface is different from the vocoding of TRAU frames received from the second TRACU. This means that the parties of the call employ different vocoding methods. In that case, the TRACU receiving half rate TRAU frames from the A interface changes over to full rate vocoding and performs the necessary decoding from full rate vocoding to PCM samples and encoding the PCM samples to full rate vocoding. This will, however, cause tandem vocoding between the different vocoders, which will deteriorate speech quality. Therefore, the TRACU marks the type of vocoding employed by the TRAU frames of the A interface on the control bits of the full rate TRAU frames it is sending to the other TRACU. In this way, the other TRACU and TRAU are informed of the preferred vocoding method. In that case, the TRACU can change the vocoding if the coding in the TRACU units is changed to be the same, as a result of which conversion and resultant tandem coding can be avoided. Full rate coding has been selected as the primary coding method between the TRACUs on account of its better tandem properties.

If block 71 in the TRACU does not receive TRAU frames from the A interface (in other words, receives only PCM-coded speech), the TRACU employs full rate vocoding as default.

In the primary embodiment of the invention, the TRACU may also incorporate a timer 87 controlling the PCM block 85 to discontinue forming of a subchannel and sending of TRAU frames to the A interface (FIG. 8) if the synchronization block 71 of that TRACU (FIG. 7) has not received TRAU frames from the A interface during a predetermined period of time. More precisely, block 85 of the TRACU (as well as the TRAU unit) sends TRAU frames in a PCM subchannel to the A interface (in the direction of the MSC) at the beginning of each cell, each time the TRAU synchronization of the A interface is lost and each time the speech coding method is changed, i.e. when for instance a handover from full rate vocoding to half rate vocoding or vice versa is performed. Simultaneously as block 85 starts sending TRAU frames, it starts the timer 87. The synchronization block 71 monitors whether TRAU frames are received in a subchannel of the A interface in the uplink direction. If the synchronization block 71 of the TRACU (or TRAU) is receiving TRAU frames in the PCM subchannel before the timeout monitored by the timer 87 has expired, the timer 87 is restarted. As a result, its control signal to block 85 remains in a mode permitting continued sending of TRAU frames to the subchannel at the A interface. If, on the other hand, the synchronization unit 71 does not receive TRAU frames in the subchannel prior to the expiry of the timeout monitored by the timer 87, the mode of the control signal of the timer 87 is changed into disable mode. When the control signal is in disable mode, block 85 stops sending TRAU frames in the subchannel to the A interface. In that situation, normal PCM samples are sent to the A interface. The timer 87 is used in order for the PCM samples to be sent to the A interface not to be unnecessarily corrupted in cases where it is not appropriate to send a subchannel (as the other end does not have equipment to receive TRAU frames). The synchronization unit 71, however, continuously monitors the PCM samples received from the A interface, and if it receives TRAU frames in the PCM subchannel, the timer 87 is restarted. As a result, the control signal of the timer 87 is changed into transmission mode, whereupon block 85 starts sending TRAU frames in the PCM subchannel of the A interface. Thus, the subchannel can be taken into use immediately when there is equipment capable of processing TRAU frames at the other end. The timeout may be from a couple of seconds to a couple of tens of seconds.

During the call, loss of synchronization may be arise for example from the fact that the MSC switches a signalling tone or an announcement for a few seconds to the A interface. In that case, the received signal is composed of PCM samples only, and synchronization is lost in the A interface. However, on account of the time control in accordance with the invention, the TRACU is still sending frames to the A interface, and when the MSC discontinues the signalling tone or announcement, the tandem prevention mode is started immediately when a number of frames required for synchronization has been received. Another example is a handover wherein a TRAU unit not supporting tandem prevention is replaced by another TRAU unit. If in that case both the TRAU and the TRACU support tandem prevention, the tandem prevention mode is started immediately when the number of frames required for synchronization has been received. At the beginning of the call, there must be predetermined period of time for sending of TRAU frames, e.g. 20 seconds, as the actual interconnection of the TRAU and TRACU is made only after the called subscriber has responded, and therefore the TRACU (or TRAU) starts receiving TRAU frames from the A interface only thereafter. Also in the middle of the call the monitoring period is preferably about 20 s, as it is presumed that the majority of temporary interruptions in the frames of the A interface are shorter than this.

Although the optimization of interexchange connections in accordance with the present invention has been described in detail above, some exemplary cases of different call situations are given in the following.

Mobile to mobile calls (MMC)

Let us assume initially that MS1 in FIG. 1 is a full rate MS and MS2 is also a full rate MS. TRAU1 starts normal full rate operation and starts sending full rate TRAU frames in the A interface direction, i.e. to the compression equipment TRACU1. When TRACU1 receives these TRAU frames, it starts sending full rate frames to the A interface, and a tandem preventive connection has been formed between these units. TRACU2 performs a similar procedure with TRAU2, and after this there is a non-tandem connection between the mobile stations MS1 and MS2 as both TRACUs are now transferring full rate frames.

If MS 1 and MS2 are half rate mobile stations MS, the situation is slightly more complicated. TRAU1 starts normal half rate operation and also starts sending half rate frames in the A interface direction to TRACU1. When TRACU1 receives these TRAU frames, it starts sending half rate TRAU frames to the A interface, and a tandem preventive connection has been formed between these units. TRACU1 also changes the vocoding mode employed in the interconnecting PCM link between the TRACUs into half rate coding and transfers the frames received from TRAU1 to TRACU2. TRAU2 and TRACU2 perform a similar procedure, and after this there is a non tandem connection between the mobile stations MS1 and MS2 as both TRACUs are transferring half rate TRAU frames.

If mobile station MS1 is a half rate MS and mobile station MS2 is a full rate MS, the situation is the most complex. TRAU1 starts normal half rate operation and starts also sending half rate frames in the A interface direction to TRACU1. When TRACU1 receives these TRAU frames, it starts sending half rate frames to the A interface, and a tandem preventive connection is forming between these units. TRACU1 also changes the vocoding employed in the interconnecting PCM link between the TRACUs into half rate coding and transfers the TRAU frames received from TRAU1 to TRACU2. TRAU2 and TRACU2 perform a similar procedure with full rate, and when TRACU2 detects that it is receiving half rate TRAU frames from TRACU1 although it is sending full rate TRAU frames to TRAU2, it changes the vocoding employed in the interconnecting PCM link into full rate coding. Hence, a connection has been established having no tandem prevention between the mobile stations MS. If MS1 and TRAU1 now perform a handover from half rate to full rate, TRACU1 only starts transferring these frames without any extra conversion, and the result is a non tandem connection. If, on the other hand, there is a handover in MS2 and TRAU2 from full rate to half rate, TRACU2 detects from the control bits of the TRAU frames sent by TRACU1 that MS1 employs half rate vocoding and that it can change its vocoding type to half rate coding, again resulting in a tandem free connection.

Mobile to PSTN calls

In cases where the calls terminates or is routed to the PSTN instead of another mobile station MS, the compression equipment TRACU in accordance with the invention guarantees a non tandem connection irrespective of whether the call is going to the PSTN from exchange MSC1 or exchange MSC2. This is due to the fact that in such a case, there is always only one vocoding type in use within the GSM network elements. For example, if in the case of FIG. 1 MS1 is a full rate MS, TRAU1 starts normal full rate operation and starts sending full rate TRAU frames in the A interface direction to TRACU3 or TRACU1. When TRACU1 or TRACU3 receives these frames, it starts sending full rate frames to the A interface, and a tandem preventive connection is formed between these units. TRACU1 or TRACU3 starts sending full rate TRAU frames to TRACU2 or TRACU4. TRACU2 or TRACU4 decodes the vocoded speech into PCM coded speech, which is transferred to a PSTN gateway exchange GW2 or GW1. Vocoding is only performed in mobile station MS1 and the second compression equipment TRACU2 or TRACU4, which will prevent tandem coding.

The solution in accordance with the invention also supports all supplementary services similarly as has been set forth in the above-stated patent application.

Compression of inter-MSC lines will not present any problems with respect to echo cancellation as echo cancellers are not used in these connections. However, in connections between the mobile services switching centre MSC and the PSTN, there is an echo canceller between TRAU1 and TRACU3 in the PSTN line. This will result in corruption of the TRAU frames in the least significant bits of the PCM samples, thereby creating a tandem connection. In addition, the TRACUs in the PSTN connection generate a certain amount of delay, and therefore the proper operation of the echo canceller may be jeopardized. The best solution would be to move the echo canceller to the PSTN gateway exchanger GW1 after TRACU4. This enables tandem prevention and proper operation of the echo canceller.

Data calls

The compression in accordance with the invention can be implemented in data calls as well. In that case, some additional properties are needed both in the TRAUs and in the TRACUs in order to protect the data from the speech coding functions. In the case of data calls, a similar kind of method is used as in the case of speech, i.e. the least significant bit or bits of the PCM sample are used as subchannels for TRAU frames containing data. The least significant bits of the PCM sample can be used for this purpose as the normal V.110 data frame uses only the two most significant bits of the PCM sample in the case of data. Every time a transcoder TRAU receives data frames from the base station BTS, it performs the normal rate adaptation functions in accordance with the GSM recommendations, forming a V.110 data frame which is inserted into the two most significant bits of the PCM sample. Furthermore, it sends the TRAU frames containing data in the least significant bit or bits of the PCM samples without rate adaptation. The TRACU processes data received from the A interface in a similar way. The separation block 72 separates the received data-containing PCM samples instead of the encoding block 73 to the rate adaptation block 77 which performs the normal rate adaptation operations in accordance with the GSM recommendations, whereafter the rate-adapted data is inserted into TRAU data frames in the frame building block 75. If the received PCM signal also contains a data subchannel, the frames received in the subchannel are transferred through processing block 74 to frame building block 75, whereafter they are multiplexed into a subchannel of the interconnecting PCM link in block 76. If no data subchannel is being received from the A interface, the TRAU frames formed through rate adaptation unit 77 are multiplexed into the subchannel of the interconnecting PCM link.

In the reverse transmission direction, the TRAU data frames received from a subchannel of the interconnecting PCM link are applied from the processing unit 82 (FIG. 8) to the supplementary processing unit 84 and also to the rate adaptation unit 86. The rate adaptation unit performs the normal rate adaptation operations in accordance with the GSM recommendations, forming a V.110 data frame which is inserted into the two most significant bits of the PCM sample in unit 85. Furthermore, the unit 85 inserts the data-containing TRAU frames into the least significant bit or bits of the PCM samples without rate adaptation. The PCM samples are sent to the exchange. Hence, a data call is analogous with the above-described voice call, except that in addition to speech encoding functions a rate coding unit is provided.

Also data calls will be best described by way of an example. Let us assume that a data call is made from PSTN through a mobile services switching centre MSC2 to a mobile station MS2. In that case, no problems will be encountered as the base station BTS2 informs the transcoder TRAU2 in the normal way by means of the control bits of the TRAU frame that the call is a data call and therefore data operations should be used. At this stage, a normal data call is concerned. If an interexchange handover is performed so that the call is transferred to base station BTS1 and routing must be made through compression equipment TRACU2 and TRACU1, TRAU1 will now receive normal information from base station BTS2 that the call is a data call. As a result, TRAU1 starts sending TRAU data frames in one or more least significant bits of the PCM samples. These TRAU frames are passed to TRACU1 which changes the frame type of the TRAU frames it is sending to TRACU2 into TRAU data from type. When TRACU2 receives these frames, it detects that the cell is a data call and starts performing the normal rate adaptation function from TRAU frames into V.110 frames in this direction and from V.110 frames into TRAU frames in the reverse direction. In this way, data is transmitted over the compressed connection.

The figures and the description pertaining to them are only intended to illustrate the present invention. In its details, the invention may vary within the scope and spirit of the attached claims.

What is claimed is:

1. A compression apparatus for a transmission link between switching center in a telecommunications network, the compression apparatus being intended to be located in association with a first switching center and connected to a number of inbound PCM transmission channels from the switching center for receiving a speech signal from each PCM transmission channel and transferring said speech signal via an interconnecting PCM link having a transmission capacity lower than said number of PCM transmission channels received from the switching center to a second compression apparatus located in association with a second switching center, wherein the speech signal between the first switching center and the compression apparatus is either a pure PCM coded speech signal or a PCM coded speech signal in which one or more least significant bits of the PCM samples provide a sub-channel for lower-rate vocoded speech, said vocoded speed containing essentially the same speech information as the PCM samples but in a vo-coded format, said interconnecting PCM link between said first and second compression apparatuses has one or more PCM channels in each of which all bits of the PCM samples are utilized for providing two or more subchannels in each of which lower-rate vocoded speech or data can be transmitted, the compression apparatus is arranged, in response to the fact that the speech signal of the PCM channel received from the first switching center is a PCM coded speech signal containing said subchannel, to multiplex the content of the subchannel into one of the subchannels in said interconnecting PCM link, the compression apparatus is arranged, in response to the fact that the speech signal received from the first switching center is a pure PCM coded speech signal, to encode this PCM coded speech signal into a lower-rate vocoded speech signal and to multiplex the vocoded speech signal into one of the subchannels in said interconnecting PCM link.

2. Transmission equipment as claimed in claim 1, wherein the compression apparatus is arranged to decode the vocoded speech signal received from each subchannel of said interconnecting PCM link from the second compression apparatus into PCM samples and to insert said received vocoded speech signal without decoding into the subchannel formed by one or more least significant bits of the PCM samples, and the compression apparatus is arranged to transfer the PCM coded speech signal containing said vocoded speech signal via the respective PCM transmission channel to the first switching center.

3. Compression apparatus as claimed in claim 1, wherein the compression apparatus supports two or more vocoding methods, the compression apparatus is arranged to identify the vocoding method employed in said subchannel of the PCM coded speech signal received from the first switching center, and the compression apparatus is arranged to employ the identified vocoding method in the subchannel of the uplink PCM speech signal.

4. Compression apparatus as claimed in claim 3, wherein the compression apparatus is arranged to identify the vocoding method employed by the second compression apparatus on the basis of the vocoded speech signal received from the second compression apparatus via the subchannel of the interconnecting PCM link, and the compression apparatus is arranged to perform conversion, either alone or jointly with the actual vocoder of the communication system, between the vocoding method employed in the subchannel of the PCM coded speech signal received from the first switching center and the vocoding method employed by the second compression apparatus if these are different.

5. Compression apparatus as claimed in claim 3, wherein the compression apparatus is arranged to employ a predetermined vocoding method if the PCM coded speech signal received from the first switching center contains no subchannel.

6. Compression apparatus as claimed in claim 1, wherein the vocoded speech signal transferred in said subchannels is in transmission frames.

7. Compression apparatus as claimed in claim 6, the vocoding method supported by the compression apparatus is the vocoding method employed by the mobile communication network, and said frames are identical with the frames employed in the mobile communication network between the base station and the transcoder unit.

8. Compression apparatus as claimed in claim 6, wherein the control bits of the frame contain information on the vocoding method employed in the subchannel of vocoded speech received from the network element.

9. Compression apparatus as claimed in claim 6, comprising a timer monitoring the time that has passed from the initiation of the call, change of vocoding, or reception of the previous frame from the subchannel of the PCM channel in a first transmission direction, the timer being arranged to prevent transmission of frames in the reverse direction if said monitored time exceeds a predetermined timeout.

10. A method for transferring digitally encoded speech between a first mobile switching center and a second switching center in a mobile communication system in which mobile stations and a fixed mobile communication network comprise vocoders for transferring a speech signal over a radio path as a reduced rate vocoded speech signal and for transferring the speech signal as a PCM coded speech signal between the vocoder of the mobile network and the mobile switching centers, the method comprising the steps of:

receiving a number of PCM coded speech signals from the first mobile switching center to first compression apparatus which is located in association with said first mobile switching center, via a corresponding number of PCM transmission channels, transferring the speech signals to a second compression apparatus which is located in association with said second mobile switching center, via an interconnecting PCM link having a transmission capacity lower than said number of inbound PCM transmission channels from said first mobile switching center, transferring said number of PCM coded speech signals from the second compression apparatus to the second mobile switching center via a corresponding number of outbound PCM channels, specifying the bits of the PCM samples of at least one PCM channel of the interconnecting PCM link to from two or more subchannels in each of which a lower rate signal can be transferred, and multiplexing said PCM coded speech signals received from the first switching center in the first compression apparatus into the subchannels of the interconnecting PCM link for transmission to the second compression apparatus as follows:

a) detecting the first compression apparatus whether the received speech signal is a pure PCM coded signal or a PCM coded signal in whose PCM samples one or more least significant bits provide a subchannel in which a vocoded speech signal of the lower rate employed by the mobile communication system is transferred, said vocoded speech signal containing essentially the same speech information as the PCM samples but in a vocoded format, b) multiplexing, in response to the fact that the speech signal of the PCM channel received from the first mobile switching center contains a subchannel, the vocoded speech information of this subchannel into one of the subchannels in said interconnecting PCM link, and c) encoding, in response to the fact that the speech signal received from the first mobile switching center is a pure PCM coded speech signal, the PCM coded speech signal into a lower rate vocoded speech signal by the vocoding method of the mobile communication system and multiplexing the vocoded speech signal into one of the subchannels in said interconnecting PCM link.

11. A method as claimed in claim 10, further comprising processing the speech signals received from the interconnecting PCM link in the first compression apparatus as follows:

d) decoding the vocoded speech signal received from each subchannel of said interconnecting PCM link from the second compression apparatus into PCM samples by the vocoding method of the mobile communication system, e) inserting the vocoded speech signal received from the subchannel into the subchannel formed by one or more least significant bits of said PCM samples without decoding, and f) transferring the PCM coded speech signal containing said subchannel of vocoded speech through the corresponding PCM transmission channel to the first mobile switching center.

12. A method as claimed in claim 10, comprising a step of selecting the vocoding method employed by the compression apparatus to be the same as the vocoding method employed in the subchannel of PCM coded speech received from the first mobile switching center when the compression apparatus supports two or more vocoding methods.

13. A method as claimed in claim 12, comprising a step of transferring information on the vocoding method employed in the subchannel of vocoded speech received from the first mobile switching centre between the compression apparatus in the control bits of the frames in addition to the information on the vocoding method employed between the compression apparatus.

14. A method as claimed in claim 12, comprising the steps of detecting that the first and second compression apparatus have selected different vocoding methods, performing conversion on the speech signal in either of the compression apparatus between the two vocoding methods at least in one transmission direction.

15. A method as claimed in claim 10, comprising a step of utilizing the subchannels of the interconnecting PCM link for data transmission if the PCM coded signal received from the exchange or a subchannel thereof contains data.

16. A method as claimed in claim 10, comprising the steps of transmitting frames to a subchannel of the PCM channel in a first transmission direction, and monitoring the reception of the frames from the subchannel of the speech signal of the PCM channel in the reverse transmission direction, discontinuing the transmission of frames to the subchannel of the PCM channel if frames are not received from a subchannel of the PCM channel in the reverse direction during a predetermined monitored timeout.

17. A first compression apparatus for a transmission link between switching centers in a telecommunications network, the first compression apparatus being intended to be located in association with a first switching center and connected to a number of inbound digital transmission channels from the switching center for receiving a digital signal from each digital transmission channel and transferring said digital signal via an interconnecting digital link having a transmission capacity lower than said number of digital transmission channels received from the switching center to a second compression apparatus located in association with a second switching center, wherein the digital data signal between the first switching center and the first compression apparatus is either a pure digital data sample signal or a digital speech sample signal in which one or more least significant bits of the digital data samples provide a subchannel for a vocoded speech signal having a lower rate than said pure digital data sample signal, said vocoded speech signal containing essentially the same speech information as digital speech samples in the digital speech sample signal but in a vo-coded format, said interconnecting digital link between said first and second compression apparatuses has one or more digital channels in each of which two or more subchannels is provided, in each of which lower-rate vocoded speech or data can be transmitted, the first compression apparatus is arranged, in response to the fact that the digital signal of the digital channel received from the first switching center is a digital speech sample signal containing said subchannel, to multiplex the content of the subchannel into one of the subchannels in said interconnecting digital link, and the first compression apparatus is arranged, in response to the fact that the digital signal received from the first switching center is a pure digital speech sample signal, to encode this digital speech sample signal into a lower-rate vocoded speech signal and to multiplex the vocoded speech signal into one of the subchannels in said interconnecting digital link.

18. A first compression apparatus as claimed in claim 17, wherein the first compression apparatus is arranged, in response to the fact that the digital signal received from the first switching center is a pure digital data signal, to convert this digital data signal into a lower-rate data signal and to multiplex the converted data signal into one of the subchannels in said interconnecting digital links.

19. A first compression apparatus for a transmission link between switching centers in a telecommunications network, the first compression apparatus being intended to be located in association with a first switching center and connected to a number of inbound digital transmission channels from the switching center for receiving a digital signal from each digital transmission channel and transferring said digital signal via an interconnecting digital link having a transmission capacity lower than said number of digital transmission channels received from the switching center to a second compression apparatus located in association with a second switching center, wherein the digital data signal between the first switching center and the first compression apparatus is either a pure digital data sample signal or a digital speech sample signal in which one or more least significant bits of the digital data samples provide a subchannel for a vocoded speech signal having a lower rate than said pure digital data sample signal, said interconnecting digital link between said first and second compression apparatuses has one or more digital channels in each of which two or more subchannels is provided, in each of which lower-rate vocoded speech or data can be transmitted, the first compression apparatus is arranged, in response to the fact that the digital signal of the digital channel received from the first switching center is a digital sample signal containing said subchannel, to multiplex the content of the subchannel into one of the subchannels in said interconnecting digital link, and the first compression apparatus is arranged, in response to the fact that the digital signal received from the first switching center is a pure digital speech sample signal, to encode this digital sample signal into a lower-rate vocoded speech signal and to multiplex the vocoded speech signal into one of the subchannels in said interconnecting digital link, the first compression apparatus is arranged to decode the vocoded speech signal received from each subchannel of said interconnecting digital link from the second compression apparatus into digital samples and to insert said received vocoded speech signal without decoding into the subchannel formed by one or more least significant bits of the digital samples, and the first compression apparatus is arranged to transfer the digital sample signal containing said vocoded speech signal via the respective digital transmission channel to the first switching center.

* * * * *